United States Patent
Ho et al.

(10) Patent No.: US 6,313,713 B1
(45) Date of Patent: Nov. 6, 2001

(54) MATCHED PAIR CIRCULATOR ANTENNA ISOLATION CIRCUIT

(75) Inventors: Thinh Q. Ho, Anaheim; Stephen M. Hart; Willard I. Henry, both of San Diego; Gregory A. Kosinovsky, Sunnyvale, all of CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/407,835

(22) Filed: Sep. 28, 1999

(51) Int. Cl.$^7$ .......................................................... H04B 1/50
(52) U.S. Cl. .............................................. 333/1.1; 455/82
(58) Field of Search .................................. 333/1.1; 455/82

(56) References Cited

U.S. PATENT DOCUMENTS

| | | |
|---|---|---|
| 3,305,797 | 2/1967 | Clavin . |
| 3,309,698 | 3/1967 | Baldock . |
| 3,636,452 | 1/1972 | Nuding . |
| 3,729,692 | 4/1973 | Tanaka et al. . |
| 3,982,213 | 9/1976 | Smith et al. . |
| 4,109,202 | 8/1978 | Kudsia et al. . |
| 4,159,454 | 6/1979 | Willmore . |
| 4,206,464 | 6/1980 | Hirsch . |
| 4,292,607 | 9/1981 | Goldie et al. . |
| 4,309,666 | 1/1982 | Ito et al. . |
| 4,323,899 | * 4/1982 | Barnes et al. ........................ 342/90 |
| 4,449,128 | 5/1984 | Weir . |
| 4,451,832 | 5/1984 | Stites . |
| 4,527,134 | 7/1985 | Wantuch . |
| 4,641,365 | 2/1987 | Montini, Jr. . |
| 4,688,259 | 8/1987 | Edridge . |
| 4,825,175 | 4/1989 | Tsuda et al. . |
| 5,129,099 | 7/1992 | Roberts . |
| 5,212,813 | 5/1993 | Renaud . |
| 5,291,290 | 3/1994 | Vaughan et al. . |
| 5,307,516 | 4/1994 | Nomoto . |
| 5,701,595 | 12/1997 | Green, Jr. . |

* cited by examiner

*Primary Examiner*—Justin P. Bettendorf
(74) *Attorney, Agent, or Firm*—Harvey Fendelman; James A. Ward; Eric James Whitesell

(57) ABSTRACT

A matched pair circulator antenna isolation circuit provides isolation between an antenna and one or more receivers and transmitters and may also be applied to other RF devices. A portion of the transmit signal is extracted by a first RF circulator and divided into two phase-inverted signals. The first phase-inverted signal is coupled through a first directional coupler to cancel most of the transmit signal present in the receive signal. The second phase-inverted signal is coupled through a second directional coupler to cancel remaining transmit signal in the output of the first directional coupler. The output of the second directional coupler is coupled to the input of the receiver.

9 Claims, 1 Drawing Sheet

MATCHED PAIR CIRCULATOR ANTENNA ISOLATION CIRCUIT

LICENSING INFORMATION

The invention described below is assigned to the United States Government and is available for licensing commercially. Technical and licensing inquiries may be directed to Harvey Fendelman, Patent Counsel, Space and Naval Warfare Systems Center San Diego, Code D0012 Rm 103, 53510 Silvergate Avenue, San Diego, Calif. 92152; telephone no. (619)553-3001; fax no. (619)553-3821.

BACKGROUND OF THE INVENTION

The present invention relates generally to antenna isolation circuits for transmitters and receivers using the same antenna. More specifically, but without limitation thereto, the present invention relates to an input/output isolation circuit that extracts energy from a radio frequency (RF) output signal to cancel undesired coupling of the RF output signal into one or more RF input devices.

It is often advantageous to couple multiple devices, such as a transmitter and a receiver, to the same antenna. A common approach uses a radio frequency circulator to isolate the transmitted signal from the received signal to avoid overloading the receiver front end. However, current technology for RF circulators limits the degree of isolation to about 25 dB. The conventional methods are therefore not suited to applications that require 50 dB or more of isolation. A need therefore exists for an antenna isolation circuit that attenuates the coupling of undesired RF signals by at least 50 dB.

SUMMARY OF THE INVENTION

The present invention is directed to overcoming the problems described above, and may provide further related advantages. No embodiment of the present invention described herein shall preclude other embodiments or advantages that may exist or become obvious to those skilled in the art.

A matched pair circulator antenna isolation circuit of the present invention provides isolation between an antenna and one or more receivers and transmitters and may also be applied to other RF devices. A portion of the transmit signal is extracted by a first RF circulator and divided into two phase-inverted signals. The first phase-inverted signal is coupled through a first directional coupler to cancel most of the transmit signal present in the receive signal. The second phase-inverted signal is coupled through a second directional coupler to cancel remaining transmit signal in the output of the first directional coupler. The output of the second directional coupler is coupled to the input of the receiver.

An advantage of the matched pair circulator antenna isolation circuit of the present invention is that a high degree of signal isolation may be provided between an antenna and multiple transmitters and receivers.

Another advantage is that the design of the matched pair circulator antenna isolation circuit may readily be scaled to include additional RF devices.

The features and advantages summarized above in addition to other aspects of the present invention will become more apparent from the description, presented in conjunction with the following drawings.

DESCRIPTION OF THE INVENTION

Figure 1:
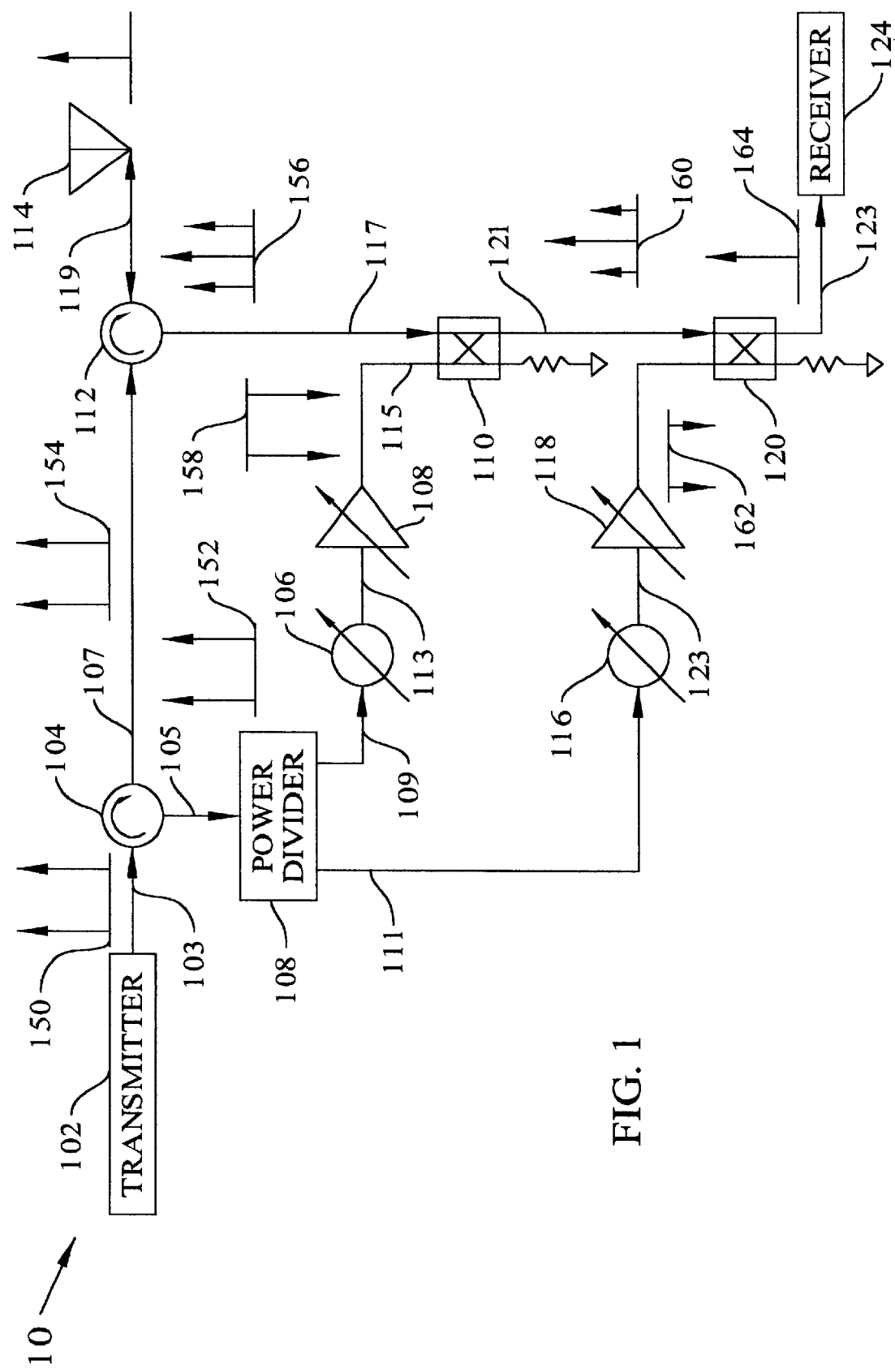
FIG. 1 is a functional diagram of a matched pair circulator antenna isolation circuit of the present invention.

The following description is presented solely for the purpose of disclosing how the present invention may be made and used. The scope of the invention is defined by the claims.

FIG. 1 is a circuit diagram of a matched pair circulator isolation circuit 10 for cancelling output signal 103 coupled from an RF communications transmitter 102 through RF circulator 112 into a circulated receive signal 117 from an RF communications antenna 114. To simplify the description, signal lines have the same reference number as the signals they carry.

Transmitter 102 outputs transmit signal 103 to a first RF circulator 104. Transmit signal 103 is represented by waveform 150. Some of transmit signal 103 is coupled by RF circulator 104 to constitute divider signal 105 represented by waveform 152. The remainder of transmit signal 103 is output from RF circulator 104 as output signal 107, represented as waveform 154. Output signal 107 is input to a second RF circulator 112. RF circulator 112 couples output signal 107 to RF antenna 114, but a portion of output signal 107 is unavoidably coupled into circulated receive signal 117. The superposition of an input signal from antenna 114 and output signal 107 in circulated receive signal 117 is illustrated by waveform 156. RF circulator 112 outputs circulated receive signal 117 to directional coupler 110. A power divider 108 outputs a higher power signal 109 and a lower power signal 111 from divider signal 105. Higher power signal 109 is phase-inverted by phase inverter 106. Phase-inverted signal 113 is adjusted for amplitude by amplifier 108 as represented by waveform 158. Amplitude adjusted signal 115 is combined by directional coupler 110 to with circulated receive signal 117. Amplifier 108 and phase inverter 106 may be coarsely adjusted to cancel most of output signal 107 coupled into circulated receive signal 117 by RF circulator 112 as illustrated by waveform 160.

Lower power signal 111 is phase-inverted by phase inverter 116. Phase-inverted signal 123 is adjusted for amplitude by amplifier 118 as illustrated by waveform 162. Amplitude adjusted signal 118 is combined by a second directional coupler 120 with directional coupler output 121 from directional coupler 110. Amplifier 118 and phase inverter 116 may be finely adjusted to balance the remainder of output signal 107 present in directional coupler output 121 as illustrated by waveform 164. Output coupler 120 outputs isolated receive signal 123 to receiver 124.

Cascaded RF circulators 104 and 112 are preferably a matched pair, and may be, for example, Tekelec Microwave Part No. BB300700. Directional couplers 110 and 120 may be, for example, Merrimac Model C-114 or Model CBF-20A-1250.

Alternatively, an additional power divider may be cascaded with power divider 108 to include more phase shifters and amplifiers for providing further cancellation of output signal 107 coupled into circulated receive signal 117.

Other modifications, variations, and applications of the present invention may be made in accordance with the above teachings other than as specifically described to practice the invention within the scope of the following claims.

We claim:

1. A matched pair circulator isolation circuit comprising:
   a first RF circulator for connecting to an output signal source;
   a power divider connected to the first RF circulator for dividing a portion of the output signal into a higher power signal and a lower power signal;

a first phase shifter having an adjustable amplitude output connected to the higher power signal for outputting a coarse adjustment signal;

a second RF circulator connected to the first RF circulator for connecting the output signal to a load and for receiving an input signal from an input signal source;

a first directional coupler connected to the second RF circulator and the first phase shifter for superimposing the coarse adjustment signal onto the input signal to output a first isolated signal;

a second phase shifter having an adjustable amplitude output connected to the lower power signal for outputting a fine adjustment signal;

and a second directional coupler coupled to the second phase shifter and the first directional coupler for superimposing the fine adjustment signal onto the first isolated signal to output a second isolated signal.

2. The matched pair circulator isolation circuit of claim 1 further comprising the source of the output signal.

3. The matched pair circulator isolation circuit of claim 2 wherein the source of the output signal is an RF communications transmitter.

4. The matched pair circulator isolation circuit of claim 1 further comprising the source of the input signal.

5. The matched pair circulator isolation circuit of claim 4 wherein the source of the input signal is an RF communications antenna.

6. The matched pair circulator isolation circuit of claim 1 further comprising the load.

7. The matched pair circulator isolation circuit of claim 6 wherein the load is an RF communications antenna.

8. The matched pair circulator isolation circuit of claim 1 wherein the output signal is an RF communications signal.

9. The matched pair circulator isolation circuit of claim 1 wherein the input signal is an RF communications signal.

* * * * *